(12) United States Patent
Choi et al.

(10) Patent No.: US 11,235,675 B2
(45) Date of Patent: Feb. 1, 2022

(54) V2V CHARGING CABLE AND CONTROL METHOD THEREOF

(71) Applicants: HYUNDAI MOTOR COMPANY, Seoul (KR); KIA MOTORS CORPORATION, Seoul (KR)

(72) Inventors: Jaehyuk Choi, Seoul (KR); Jaewon Lee, Chungcheongnam-do (KR); Byeong Seob Song, Yongin-si (KR); Samgyun Kim, Hwaseong-si (KR); Na Lae Kwon, Seoul (KR); Hyun Soo Park, Seoul (KR); Soung Han Noh, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 233 days.

(21) Appl. No.: 16/746,345

(22) Filed: Jan. 17, 2020

(65) Prior Publication Data
US 2021/0008994 A1 Jan. 14, 2021

(30) Foreign Application Priority Data
Jul. 12, 2019 (KR) .................. 10-2019-0084631

(51) Int. Cl.
*B60L 53/18* (2019.01)
*B60L 53/62* (2019.01)
*H04W 4/46* (2018.01)
*B60L 50/50* (2019.01)

(52) U.S. Cl.
CPC ............. *B60L 53/18* (2019.02); *B60L 50/50* (2019.02); *B60L 53/62* (2019.02); *H04W 4/46* (2018.02)

(58) Field of Classification Search
CPC .................................................. B60L 53/18
USPC ........................................................ 320/104
See application file for complete search history.

(56) References Cited

U.S. PATENT DOCUMENTS

| 5,936,381 | A | * | 8/1999 | Suh | ............. | H02J 7/0048 |
| | | | | | | 320/104 |
| 8,428,802 | B2 | * | 4/2013 | Kizaki | ............. | B60K 6/32 |
| | | | | | | 701/22 |
| 9,260,024 | B1 | * | 2/2016 | Lau | ............. | B60L 53/14 |
| 2016/0368390 | A1 | * | 12/2016 | Yang | ............. | H02M 7/537 |
| 2019/0001833 | A1 | * | 1/2019 | Coburn | ............. | B60L 53/66 |
| 2019/0047427 | A1 | * | 2/2019 | Pogorelik | ............. | G06Q 20/405 |
| 2019/0165591 | A1 | * | 5/2019 | Kisacikoglu | ............. | H02J 7/342 |
| 2019/0217732 | A1 | * | 7/2019 | Zhou | ............. | B60L 53/14 |
| 2019/0275894 | A1 | * | 9/2019 | Amacker | ............. | H04L 9/0637 |

(Continued)

FOREIGN PATENT DOCUMENTS

| CN | 111697403 A | * | 9/2020 |
| CN | 112810470 A | * | 5/2021 |
| JP | 5493441 B2 | | 5/2014 |

(Continued)

*Primary Examiner* — Jerry D Robbins
(74) *Attorney, Agent, or Firm* — Slater Matsil, LLP

(57) ABSTRACT

A charging cable includes a first connector including a first proximity detection pin and a first power pin; a second connector comprising a second proximity detection pin and a second power pin; and a cable electrically connecting the first power pin of the first connector and the second power pin of the second connector, wherein the cable may not connect the first proximity detection pin and the second proximity detection pin.

19 Claims, 8 Drawing Sheets

(56) References Cited

U.S. PATENT DOCUMENTS

2020/0282857 A1* 9/2020 Mortensen .............. B60L 53/66

FOREIGN PATENT DOCUMENTS

| KR | 10-2018-0060454 A | 11/2016 | | |
|----|-------------------|---------|---|---|
| KR | 10-1921390 B1 | 11/2018 | | |
| KR | 10-2019-0027493 A | 3/2019 | | |
| WO | WO2018/101702 A1 | 6/2018 | | |
| WO | WO-2019226630 A1 * | 11/2019 | ........... | H04B 5/0012 |

* cited by examiner

| CONNECTION STATE OF CHARGING CABLE | MINIMUM VOLTAGE [V] | NOMINAL VOLTAGE [V] | MAXIMUM VOLTAGE [V] |
|---|---|---|---|
| SEPARATED | 4.13 | 4.46 | 4.78 |
| SWITCH ELEMENT OPENED | 2.38 | 2.77 | 3.16 |
| CONNECTED | 1.23 | 1.53 | 1.82 |

V2V CHARGING CABLE AND CONTROL METHOD THEREOF

CROSS-REFERENCE TO RELATED APPLICATION

The present application claims priority to and the benefit of Korean Patent Application No. 10-2019-0084631, filed on Jul. 12, 2019, which is incorporated herein by reference in its entirety.

TECHNICAL FIELD

The present disclosure relates to a vehicle-to-vehicle (V2V) charging cable for vehicle-to-vehicle electrical charging and a control method thereof.

BACKGROUND

The statements in this section merely provide background information related to the present disclosure and may not constitute prior art.

In general, vehicles use gasoline or diesel as fuel, and gasoline and diesel not only generate harmful substances and cause air pollution, but also due to the depletion of crude oil, each industry is in a hurry to develop alternative energy, and to develop and operate electric vehicles as an alternative.

However, in the case of electric vehicles, the time required for charging is longer than that of gasoline and diesel vehicles, which causes trouble in operation, and the charging infrastructure is also insufficient, which makes it many difficult to commercializing electric vehicles.

In addition, as demand for electric vehicles is expected to increase explosively with increasing demand for electric vehicles, an energy supply and demand strategy will be needed to meet the demand for electric power in order to commercialize electric vehicles.

Accordingly, there is a demand for a vehicle-to-vehicle charging method for charging an electric vehicle lacking a battery by connecting a charging cable between a plurality of electric vehicles.

SUMMARY

The present disclosure provides a vehicle-to-vehicle charging cable capable of determining a connection state of a charging connector and a vehicle and performing vehicle-to-vehicle charging according to a proximity detection voltage standard according to a connection state of the charging connector, and a control method thereof.

In one form of the present disclosure, a charging cable may comprise: a first connector including a first proximity detection pin and a first power pin; a second connector configured to a second proximity detection pin and a second power pin; and a cable configured to electrically connect the first power pin of the first connector and the second power pin of the second connector, wherein the cable may not connect the first proximity detection pin and the second proximity detection pin.

The first connector may include a first control pilot pin, the second connector may include a second control pilot pin, and the cable may connect the first control pilot pin and the second control pilot pin.

The first connector may comprise: a first ground pin electrically connected to the first proximity detection pin; and a first resistance located between the first ground pin and the first proximity detection pin, and the second connector may comprise: a second ground pin electrically connected to the second proximity detection pin; and a second resistance located between the second ground pin and the second proximity detection pin.

The cable may not connect the first resistance and the second resistance.

The first connector may further includes a first switch element connected in parallel with the first resistance and implemented as a normally-closed switch element that operates in response to an operation of a switch provided outside the first connector, and the second connector may further includes a second switch element connected in parallel with the first resistance and implemented as a normally-closed switch element that operates in response to an operation of a switch provided outside the second connector.

In one form of the present disclosure, a charging cable may comprise: a first connector including a first proximity detection pin and a first power pin; a second connector configured to a second proximity detection pin and a second power pin; a cable configured to electrically connect the first power pin of the first connector and the second power pin of the second connector to form a power supply path; and a communication controller configured to control supply of charging power through the power supply path according to a connection state of each of the first connector and the second connector to the vehicle, wherein the cable may not connect the first proximity detection pin and the second proximity detection pin.

The communication controller may include a controller configured to determine a connection state between the first connector and a first vehicle based on the first detection signal of the first proximity detection pin, and to determine a connection state between the second connector and a second vehicle based on the second detection signal of the second proximity detection pin.

The controller may determine a connection state between the first connector and the first vehicle by comparing the voltage of the first detection signal with a predetermined proximity detection voltage standard, and may determine a connection state of the second connector and the second vehicle by comparing the voltage of the second detection signal with the proximity detection voltage standard.

When determining that the first connector and the first vehicle are connected, and when determining that the second connector and the second vehicle are connected, the controller may generate a power transmission signal for controlling the supply of charging power through the power supply path.

The first connector further includes a first control pilot pin, the second connector further includes a second control pilot pin, and the communication controller may further include a communicator configured to receive a charge state signal for a battery charge state of the first vehicle and the second vehicle through the first control pilot pin and the second control pilot pin and to transmit the power transmission signal to the first vehicle and the second vehicle through the first control pilot pin and the second control pilot pin.

The communicator may transmit/receive a signal with the first vehicle and the second vehicle using power line communication.

The first connector may include: a first ground pin electrically connected to the first proximity detection pin; and a first resistance located between the first ground pin and the first proximity detection pin, and the second connector may include a second ground pin electrically connected to the second proximity detection pin; and a second resistance located between the second ground pin and the second proximity detection pin.

The cable may not connect the first resistance and the second resistance.

The first connector further includes a first switch element connected in parallel with the first resistance and implemented as a normally-closed switch element that operates in response to an operation of a switch provided outside the first connector, and the second connector further includes a second switch element connected in parallel with the first resistance and implemented as a normally-closed switch element that operates in response to an operation of a switch provided outside the second connector.

In one form of the present disclosure, a control method of a charging cable comprising a first connector including a first proximity detection pin and a first power pin; a second connector configured to a second proximity detection pin and a second power pin; and a cable not connecting the first power pin of the first connector and the second power pin of the second connector, may comprises detecting a first detection signal of the first proximity detection pin and a second detection signal of the second proximity detection pin; determining a connection state of the first connector and the first vehicle based on the first detection signal; and determining a connection state between the second connector and the second vehicle based on the second detection signal.

The determining a connection state between the first connector and the first vehicle may include determining a connection state between the first connector and the first vehicle by comparing the voltage of the first detection signal with a predetermined proximity detection voltage standard, and the determining a connection state between the second connector and the second vehicle may include determining a connection state between the second connector and the second vehicle by comparing the voltage of the second detection signal with a predetermined proximity detection voltage standard.

In some forms of the present disclosure, a control method of a charging cable may further include generating a power transmission signal when determining that the first connector is connected to the first vehicle and the second connector is connected to the second vehicle.

In some forms of the present disclosure, a control method of a charging cable may include receiving a charge state signal for a battery charge state of the first vehicle and the second vehicle through the first control pilot pin of the first connector and the second control pilot pin of the second connector, and transmitting the power transmission signal to the first vehicle and the second vehicle through the first control pilot pin and the second control pilot pin.

The receiving a charge state signal and the transmitting the power transmission signal may include transmitting/receiving a signal with the first vehicle and the second vehicle using power line communication.

In some forms of the present disclosure, the proximity detection voltage standard based on state of charge can be satisfied with a simple change of circuit and the connection state between the vehicles can be easily determined according to the proximity detection voltage signal.

Further area of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
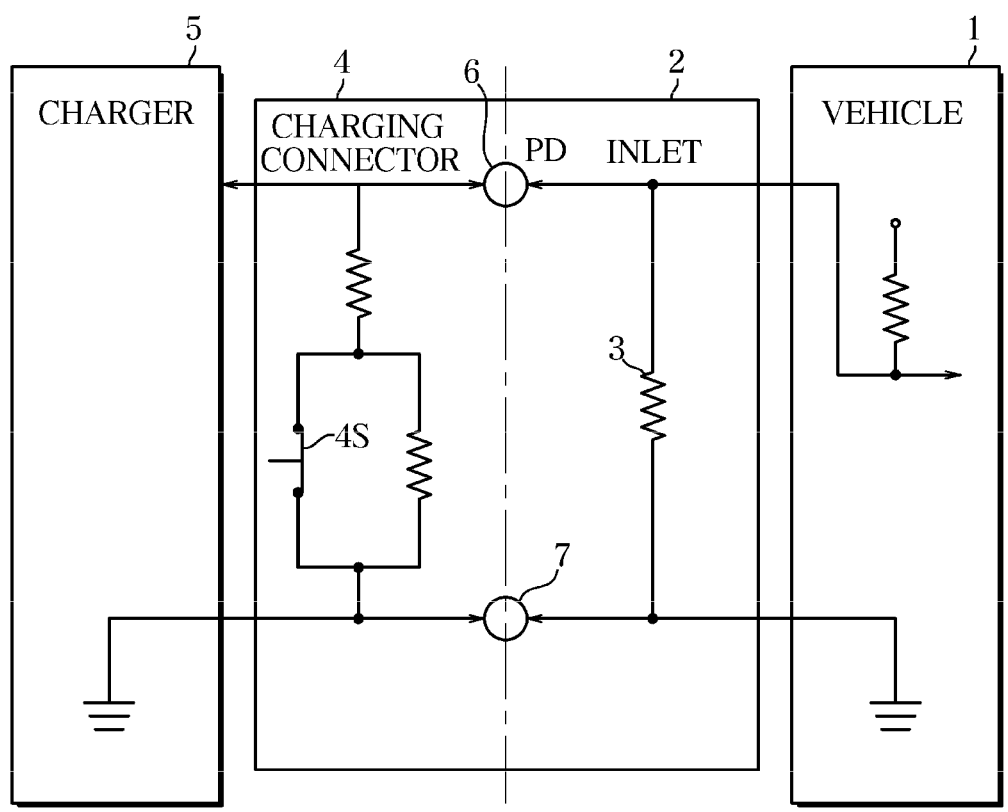
FIG. 1 is a view showing a circuit of a charging cable having one connector in the conventional art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, The terms as used throughout the specification, such as "~part", "~ module", "~ member", "~ block", etc., may refer to a unit for processing at least one function or operation. For example, the terms may refer to at least one hardware processed by at least one of hardware such as a field-programmable gate array (FPGA)/application specific integrated circuit (ASIC), at least one software stored in a memory, or a processor.

Reference numerals used for method steps are just used for convenience of explanation, but not to limit an order of the steps. Thus, unless the context clearly dictates otherwise, the written order may be practiced otherwise.

Hereinafter, a charging cable and a control method thereof in some forms of the present disclosure will be described in detail with reference to the accompanying drawings.

FIG. 1 is a view showing a circuit of a charging cable having one connector in the conventional art. Referring to FIG. 1, a conventional charging cable may include a charging connector 4 connected to an inlet 2 of a vehicle 1, and a cable (not shown) connecting the charging connector 4 and the charger 5.

The charging connector 4 may include a control pilot pin (not shown), proximity detection (PD) pin (6) and ground pin (7), such control pilot pin, proximity detection pin 6 and the ground pin 7 may be connected to the inlet 2 of the vehicle 1.

In addition, the charger 5 may include a supply equipment communication controller (SECC), and may determine a connection state between the vehicle 1 and the charger 5, that is, the inlet 2 and the charging connector 4 based on the proximity detection signal output from a circuit connected to the proximity detection pin 6.

That is, the supply equipment communication controller may determine the connection state between the vehicle 1 and the charging connector 4 based on the proximity detection voltage output from the proximity detection pin 6, and at this time, the proximity detection voltage which is a reference for determining the charging connector connection state is determined by the proximity detection voltage standard.

The table shown in FIG. 1 is a table relating to the proximity detection voltage standard (SAE-J1772). Referring to the table shown in FIG. 1, when the proximity detection voltage output from the proximity detection pin 6 is within the range of 4.13 (V) to 4.78 (V), the charger 5 may determine that the vehicle 1 and the charging connector 4 are in a disconnected state, that is, not connected. In addition, when the proximity detection voltage output from the proximity detection pin 6 is within the range of 2.38 (V) to 3.16 (V), the charger 5 may determine that the switch provided outside the charging connector 4 and interlocked with the internal switch element 4S is in an open state. In addition, when the proximity detection voltage output from the proximity detection pin 6 is within the range of 1.23 (V) to 1.82 (V), the charger 5 may determine that the vehicle 1 and the charging connector 4 are in a connected state.

At this time, the proximity detection voltage is output to satisfy the proximity detection voltage standard, according to the hardware configuration of the pre-designed inlet 2 or charging connector 4 such as resistance value of resistance elements included in charging connector 4, the resistance value of the resistance element 3 included in the inlet 2 of the vehicle 1, etc.

Figure 2:
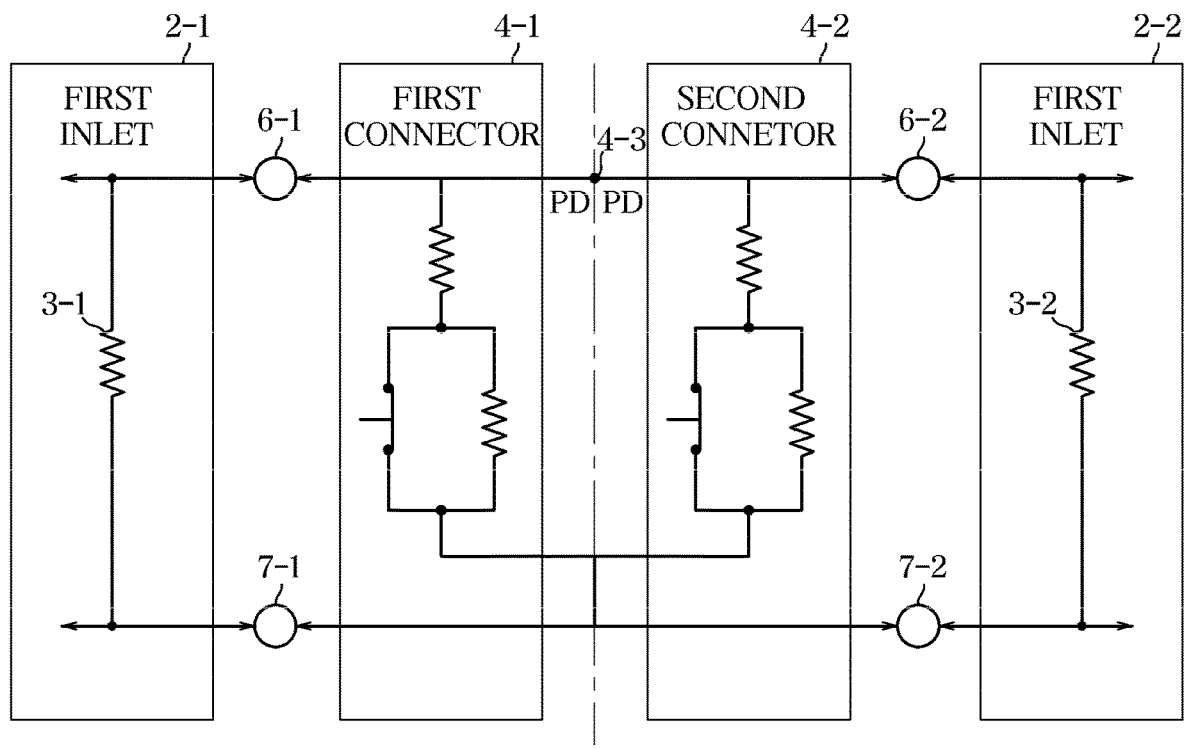
FIG. 2 is a view showing a circuit of a charging cable further having another connector in the conventional art.

FIG. 2 is a view showing a circuit of a charging cable further having another connector in the conventional art. Referring to FIG. 2, a charging cable including two connectors 4-1 and 4-2 may comprise: a first connector 4-1 connected to a first inlet 2-1 of a first vehicle; a second connector 4-2 connected to the second inlet 2-2 of the second vehicle; and a cable (not shown) connecting the first connector 4-1 and the second connector 4-2. The first connector 4-1 may include a control pilot pin (not shown), a proximity detection pin 6-1, and a ground pin 7-1, and such the control pilot pin, the proximity detection pin 6-1, and the ground pin 7-1 may be connected to the first inlet 2-1 of the first vehicle.

Similarly, the second connector 4-2 may include a control pilot pin (not shown), a proximity detection pin 6-2, and a ground pin 7-2, and such the control pilot pin, the proximity detection pin 6-2 and the ground pin 7-2 may be connected to the second inlet 2-2 of the second vehicle.

When one connector 4-1 is connected to the other connector 4-2 using a cable, the circuit connected with the proximity detection pin 6-1 of the first connector 4-1 is connected 4-3 with the circuit connected with the proximity detection pin 6-2 of the second connector 4-2 along the cable. Similarly, the circuit connected with the ground pin 7-1 of the first connector 4-1 is connected with the circuit connected with the ground pin 7-2 of the second connector 4-2 along the cable. Although not shown in the figure, the circuit connected with the control pilot pin of the first connector 4-1 is connected with the circuit connected with the control pilot pin of the second connector 4-2 along the cable.

At this time, due to the connection 4-3 between the proximity detection pins 6-1 and 6-2, the proximity detection voltage output to the first vehicle through the first inlet 2-1 does not correspond to the proximity detection voltage standard. Also, due to the connection 4-3 between the proximity detection pins 6-1 and 6-2, the proximity detection voltage output to the second vehicle through the second inlet 2-2 does not correspond to the proximity detection voltage standard.

That is, in order to output the proximity detection voltage that satisfies the proximity detection voltage standard, the hardware configuration such as the resistance element included in the connectors 4-1 and 4-2 must be changed, or the hardware configuration such as the resistance element included in the inlets 2-1 and 2-2 of the vehicle must be changed. In other words, in order to output the proximity detection voltage that satisfies the proximity detection voltage standard, the hardware configuration of the previously designed connector or inlet provided in the vehicle must be changed completely, so that the hardware configuration of the previously designed connector or inlet of the vehicle cannot be used.

In order to solve the problem as described above with reference to FIG. 2, a charging cable for charging a vehicle-to-vehicle that outputs a proximity detection voltage satisfying a proximity detection voltage standard is required. Hereinafter, a vehicle-to-vehicle charging cable in some forms of the present disclosure will be described in detail with reference to FIGS. 3 to 7.

Figure 3:
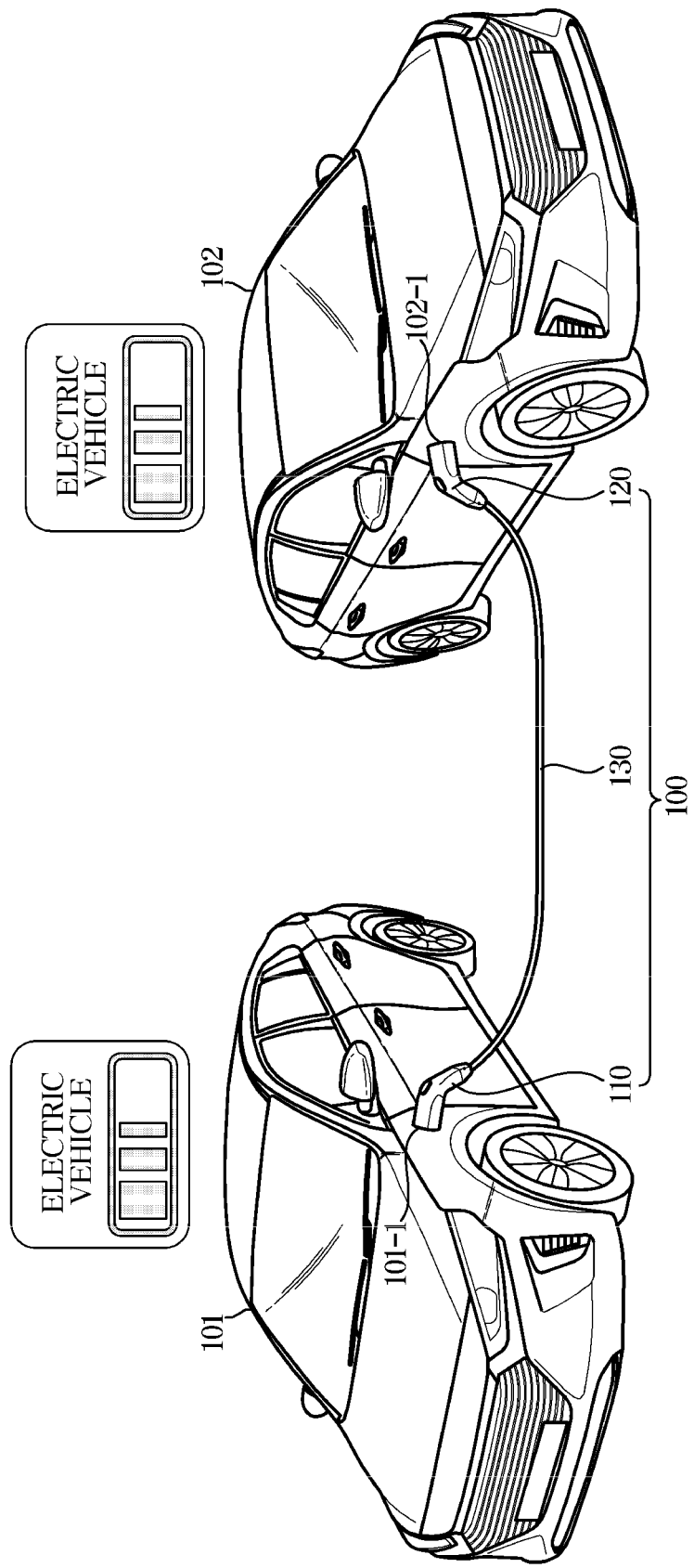
FIGS. 3 and 4 are a view showing the appearance of a charging cable in one form of the present disclosure.
Figure 4:
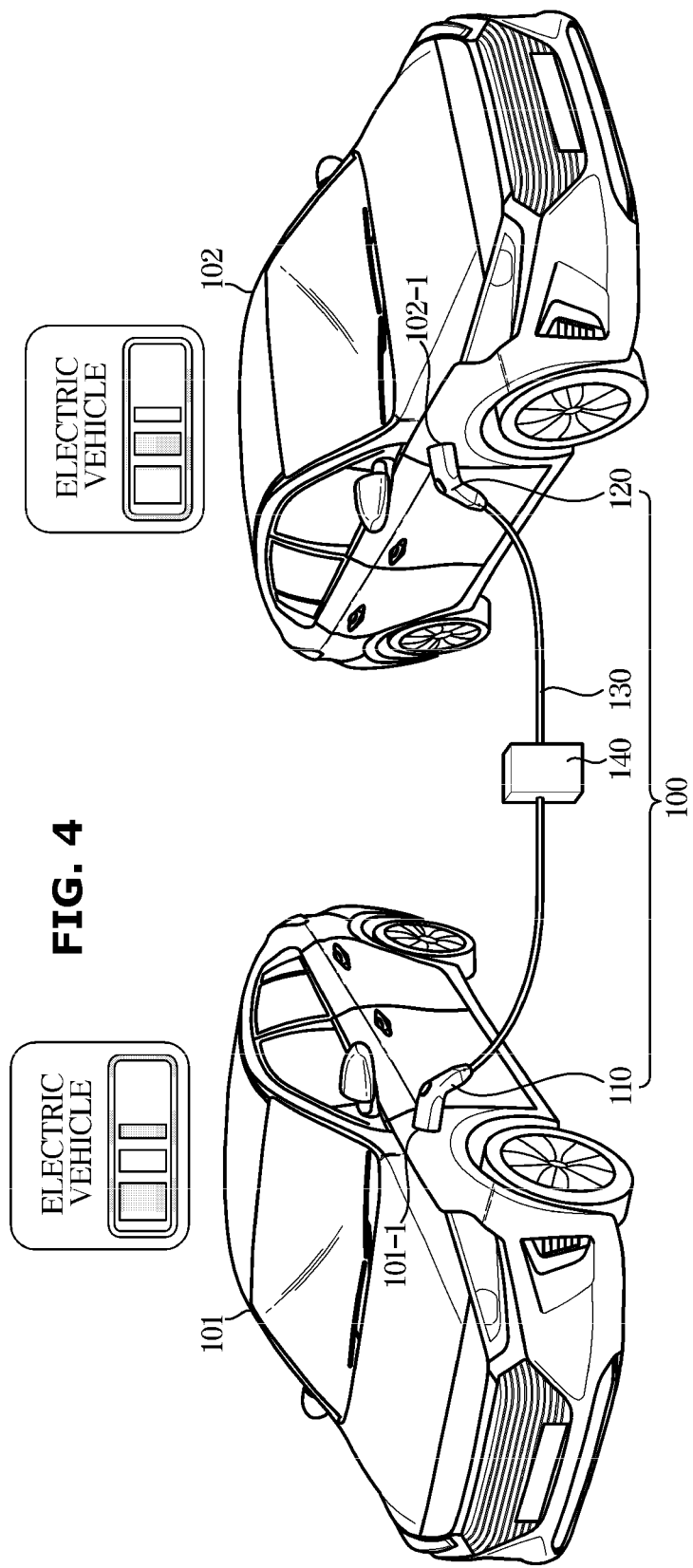

FIGS. 3 and 4 are a view showing the appearance of a charging cable in some forms of the present disclosure. Referring to FIG. 3, the first vehicle 101 or the second vehicle 102 may include a supply equipment communication controller (SECC). In some forms of the present disclosure, the charging cable 100 may comprise a first connector 110 connected to the first inlet 101-1 of the first vehicle 101; a second connector 120 connected with the second inlet 101-2 of the second vehicle 102; and a cable 130 electrically connecting the first power pin 114 of the first connector 110 and the second power pin 124 of the second connector 120.

The first connector 110 may include a first proximity detection pin 111, a first ground pin 112, a first control pilot pin 113, and a first power pin 114 connected to the first inlet 101-1, and the second connector 120 may include a second proximity detection pin 121, a second ground pin 122, a second control pilot pin 123, and a second power pin 124 connected to the second inlet 101-2.

In order to connect the two connectors, the cable 130 may include a plurality of conductor groups (metals with high conductivity, for example copper, are used to reduce transmission losses) constituting the line as a bundle of conductors used surrounded by a protective coating. In addition, the cable 130 may mean a physical wire, but may include the meaning of a data transmission path.

Referring to FIG. 4, the cable 130 of the charging cable 100 in some forms of the present disclosure may include a main body, and a supply equipment communication controller 140 may be provided in the main body. The supply equipment communication controller 140 provided in the charging cable 100 may include a controller 141 and a communicator 142, which will be described below with reference to FIGS. 6 to 7.

In this case, the first vehicle 101 or the second vehicle 102 does not need to be equipped with the communication controller separately. In addition, the main body of the cable 130 may include a display unit (not shown) indicating the charge state or a series of procedures of charging.

Figure 5:
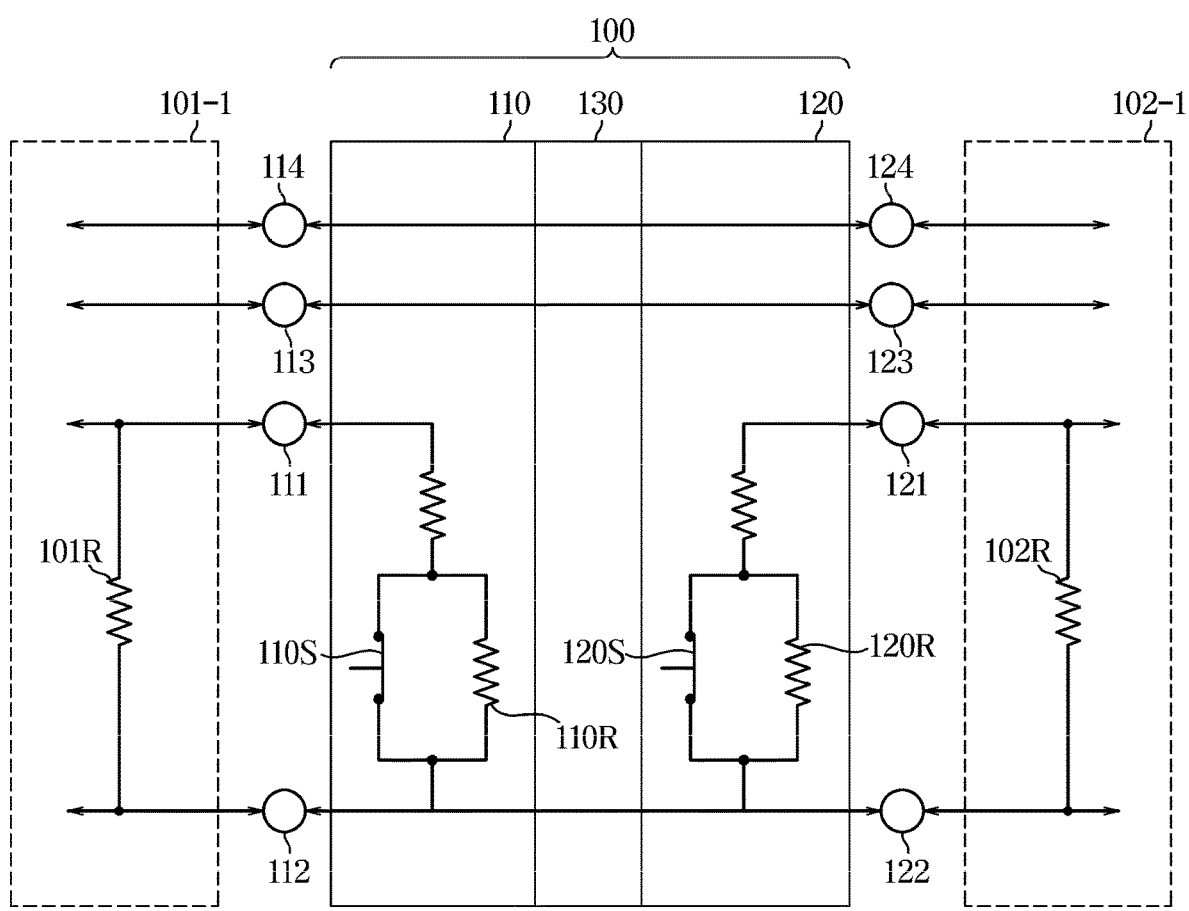
FIG. 5 is a view showing a circuit of a charging cable in one form of the present disclosure.

Hereinafter, a circuit configuration of the charging cable 100 in some forms of the present disclosure will be described with reference to FIG. 5. FIG. 5 is a view showing a circuit of a charging cable 100 in some forms of the present disclosure. Referring to FIG. 5, the cable 130 of the charging cable 100 may electrically connect the first power pin 114 and the second power pin 124, and may not connect the first proximity detection pin 111 and the second proximity detection pin 121. That is, the cable 130 of the charging cable 100 may not connect a circuit connected to the first proximity detection pin 111 and a circuit connected to the second proximity detection pin 121.

As the cable 130 does not connect the first proximity detection pin 111 and the second proximity detection pin 121, Each of the proximity detection voltage output from the first proximity detection pin 111 and the proximity detection voltage output from the second proximity detection pin 121 may satisfy the proximity detection voltage standard.

The proximity detection voltage output from each of the proximity detection pins 111 and 121 may correspond to the proximity detection voltage standard, without changing the resistance values of the resistance elements 101R and 102R of the inlets 101-1 and 102-1 or the resistance values of the resistance elements 110R and 120R included in the connectors 110 and 120.

Specifically, the cable 130 in some forms of the present disclosure may not connect the first resistance 110R included in the first connector 110 and the second resistance 120R included in the second connector 120.

The first power pin 114 and the second power pin 124 may each include a plurality of power pins, and may include a DC power pin for receiving or supplying DC power from the first vehicle 101 and the second vehicle 102, respectively; and an AC power for receiving or supplying AC power from the first vehicle 101 and the second vehicle 102, respectively. The cable 130 may form a power supply path between the first vehicle 101 and the second vehicle 102 by electrically connecting the first power pin 114 and the second power pin 124.

According to the charging cable 100 in some forms of the present disclosure described with reference to FIG. 5, the first vehicle 101 or the second vehicle 102 should include a supply equipment communication controller. For convenience of explanation, it is assumed that only the first vehicle 101 includes a supply equipment communication controller. The supply equipment communication controller included in the first vehicle 101 may determine a connection state between the first vehicle 101 and the first connector 110 based on the proximity detection voltage output from the first proximity detection pin 111 and the proximity detection voltage standard. Similarly, the proximity detection voltage output from the second proximity detection pin 121 may be transmitted to the supply equipment communication controller of the first vehicle 101 through the second control pilot pin 123, and the supply equipment communication controller included in the first vehicle 101 may determine a connection state between the second vehicle 102 and the second connector 120 based on the proximity detection voltage output from the second proximity detection pin 121 and the proximity detection voltage standard.

When determining that the first vehicle 101 is connected to the first connector 110, the supply equipment communication controller included in the first vehicle 101 may control the first vehicle 101 to prevent movement of the first vehicle 101. In addition, when determining that the second vehicle 102 is connected to the second connector 120, the first vehicle 101 and the second vehicle 102 can be controlled.

When determining that the first vehicle 101 is connected with the first connector 110 and the second vehicle 102 is connected with the second connector 120, the supply equipment communication controller included in the first vehicle 101 may determine that the first vehicle 101 is connected to the second vehicle 102.

As such, the proximity detection voltage output from each of the proximity detection pins 111 and 121 may be detected to determine a connection state between the connectors 110 and 120 and the inlets 101-1 and 101-2 of each vehicle.

Referring back to FIG. 5, the cable 130 may connect the first power pin 114 and the second power pin 124, and connect the first control pilot pin 113 and the second control pilot pin 123. In addition, the cable 130 may connect the first ground pin 112 and the second ground pin 122.

In this case, the first ground pin 112 and the first proximity detection pin 111 included in the first connector 110 may be electrically connected, and the first connector 110 may include a first switch element 110S connected in parallel with the first resistance 110R and the first resistance 110R positioned between the first ground pin 112 and the first proximity detection pin 111. The first switch element 110S may be a normally-closed switch element that is interlocked with a switch provided outside the first connector 110, that is, operates in response to an operation of a switch provided outside the first connector 110.

That is, in order for the user to connect the first connector 110 to the first inlet 101-1 of the first vehicle 101, a user must press a switch provided outside the first connector 110, and the first switch 110S included in the first connector 110 is opened in response to this operation. After that, when the user completes the connection and releases the switch provided outside the first connector 110, the first switch 110S included in the first connector 110 is closed. The switch provided outside the first connector 110 may be a push button, but is not limited thereto.

Similarly, the second ground pin 122 and the second proximity detection pin 121 included in the second connector 120 may be electrically connected, and the second connector 120 may include a switch element 120S connected in parallel with a second resistance 120R and a second resistance 120R positioned between the second ground pin 122 and the second proximity detection pin 121. Similarly, the second switch element 120S may be a normally-closed switch element that is interlocked with a switch provided outside the second connector 120, that is, operates in response to an operation of a switch provided outside the second connector 120.

According to the charging cable 100 in some forms of the present disclosure described with reference to FIG. 5, there is an advantage that a separate power supply is not required for the charging cable 100. Hereinafter, the charging cable 100 provided with the supply equipment communication controller 140 will be described with reference to FIG. 6.

Figure 6:
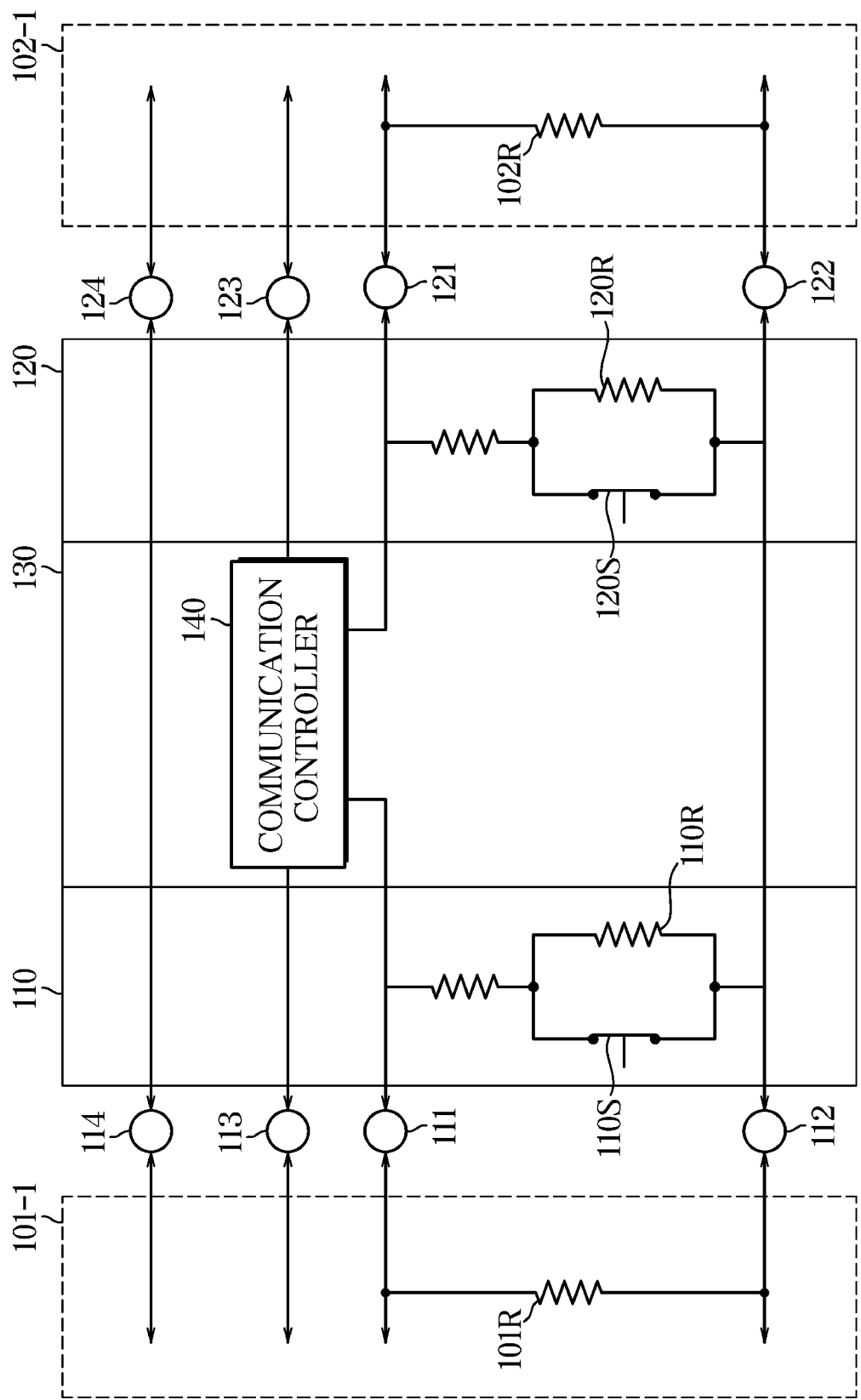
FIG. 6 is a view showing a circuit of a charging cable in one form of the present disclosure.

FIG. 6 is a view showing a circuit of a charging cable in some forms of the present disclosure. Referring to FIG. 6, the charging cable 100 in some forms of the present disclosure may include a first connector 110 connected to the first inlet 101-1 of the first vehicle 101; a second connector 120 connected with the second inlet 101-2 of the second vehicle 102; and a cable 130 electrically connecting the first power pin 114 of the first connector 110 and the second power pin 124 of the second connector 120, similarly to the charging cable 100 described with reference to FIG. 5.

In this case, the first connector 110 may include a first proximity detection pin 111, a first ground pin 112, a first control pilot pin 113, and a first power pin 114, and the second connector 120 may include a second proximity detection pin 121, a second ground pin 122, a second control pilot pin 123, and a second power pin 124.

In addition, the charging cable 100 in some forms of the present disclosure may include a communication controller 140 comprising: a controller 141 connected to the first control pilot pin 113 and the second control pilot pin 123 to control the charging between the first vehicle 101 and the second vehicle 102; and a communicator 142 that receives data for a battery charging state of the first vehicle 101 and the second vehicle 102 and transmits a control signal of the controller 141 to the first vehicle 101 and the second vehicle 102. That is, the communication controller 140 may control the supply of the charging power through the power supply path formed between the first power pin 114 and the second power pin 124.

The cable 130 in some forms of the present disclosure may connect the first proximity detection pin 111 and the controller 141, may connect the second proximity detection pin 121 and the controller 141, and may not be connect the first proximity detection pin 111 and the second proximity detection pin 121.

As the cable 130 does not connect the first proximity detection pin 111 and the second proximity detection pin 121, each of the proximity detection voltage output from the first proximity detection pin 111 and the proximity detection voltage output from the second proximity detection pin 121 may satisfy the proximity detection voltage standard.

The proximity detection voltage output from each of the proximity detection pins 111 and 121 may satisfy the proximity detection voltage standard, without changing the resistance values of the resistance elements 101R and 102R of the inlets 101-1 and 101-2 or the resistance values of the resistance elements 110R and 120R included in the connectors 110 and 120.

At this time, by generating a control signal from the communication controller 140 itself provided in the cable 130, the control signal may be transmitted each vehicle 101 and 102 through the first control pilot pin 113 and the second control pilot pin 123.

As described with reference to FIG. 5, the first ground pin 112 and the first proximity detection pin 111 included in the first connector 110 may be electrically connected, and the first connector 110 may include a first resistance 110R positioned between the first ground pin 112 and the first proximity detection pin 111, and a first switch element 110S connected in parallel with the first resistance 110R.

The cable 130 in some forms of the present disclosure may not connect the first resistance 110R included in the first connector 110 and the second resistance 120R included in the second connector 120. The first switch element 110S may be a normally-closed switch that is interlocked with a switch provided outside the first connector 110, that is, operates in response to an operation of a switch provided outside the first connector 110.

Similarly, the second ground pin 122 and the second proximity detection pin 121 included in the second connector 120 may be electrically connected, and the second connector 120 may include a second resistance 120R positioned between the second ground pin 122 and the second proximity detection pin 121, and a second switch element 120S connected in parallel with the second resistance 120R.

The second switch element 120S may be a normally-closed switch that is interlocked with a switch provided outside the second connector 120, that is, operates in response to an operation of a switch provided outside the second connector 120.

The controller 141 included in the communication controller 140 may determine a connection state between the first vehicle 101 and the first connector 110 based on the proximity detection voltage output from the first proximity detection pin 111 and the proximity detection voltage standard. Similarly, the controller 141 may determine the connection state of the second vehicle 102 and the second connector 120 based on the proximity detection voltage output from the second proximity detection pin 121 and the proximity detection voltage standard.

That is, the controller 141 may determine the connection state between the first connector 110 and the first vehicle 101 based on the first detection signal of the first proximity detection pin 111, and may determine the connection state between the second connector 120 and the second vehicle 102 based on the second detection signal of the second proximity detection pin 121.

Specifically, the controller 141 may determine the connection state of the first connector 110 and the first vehicle 101 by comparing the voltage of the first detection signal with a predetermined proximity detection standard, and may determine the connection state of the second connector 120 and the second vehicle 102 by comparing the voltage of the second detection signal with a predetermined proximity detection standard.

When determining that the first vehicle 101 is connected to the first connector 110, the controller 141 may control the first vehicle 101 such that the movement of the first vehicle 101 is impossible. In addition, when determining that the second vehicle 102 is connected to the second connector 120, the controller 141 may control the second vehicle 102 such that the movement of the second vehicle 102 is impossible.

In addition, the controller 141 may determine the connection state of the first vehicle 101 and the second vehicle 102 based on the connection state between the first connector 110 and the first vehicle 101 and the connection state between the second connector 120 and the second vehicle 102. Specifically, when determining that at least one of the connection state of the first connector 110 and the first vehicle 101 or the connection state of the second connector 120 and the second vehicle 102 is separated, the connection state between the first vehicle 101 and the second vehicle 102 may be determined as a separated state. In addition, when determining that the connection state between the first connector 110 and the first vehicle 101 and the connection state between the second connector 120 and the second vehicle 102 are connected, the connection state of the first vehicle 101 and the second vehicle 102 may be determined as the connected state.

In this way, the controller 141 may determine a connection state between each connector 110 and 120 and the inlets 101-1 and 101-2 of each vehicle by detecting the proximity detection voltage output from each of the proximity detection pins 111 and 121, respectively, and further, may determine a connection state of the first vehicle 101 and the second vehicle 102.

When determining that the first connector 110 and the first vehicle 101 are connected, and the second connector 120 and the second vehicle 102 are determined to be connected, the controller 141 may generate a power transmission signal for controlling the supply of the charging power through the power supply path formed between the first power pin 114 and the second power pin 124.

The communicator 142 may receive the battery charge state signals of the first vehicle 101 and the second vehicle 102 through the first control pilot pin 113 and the second control pilot pin 123 and may transmit the power transmission signal generated by the controller 141 to the first vehicle 101 and the second vehicle 102 through the first control pilot pin 113 and the second control pilot pin 123.

That is, the communicator 142 may transmit the generated power transmission signal to the first vehicle 101 and the second vehicle 102. In this case, the communicator 142 may transmit/receive data with the first vehicle 101 and the second vehicle 102 by using power line communication.

Figure 7:
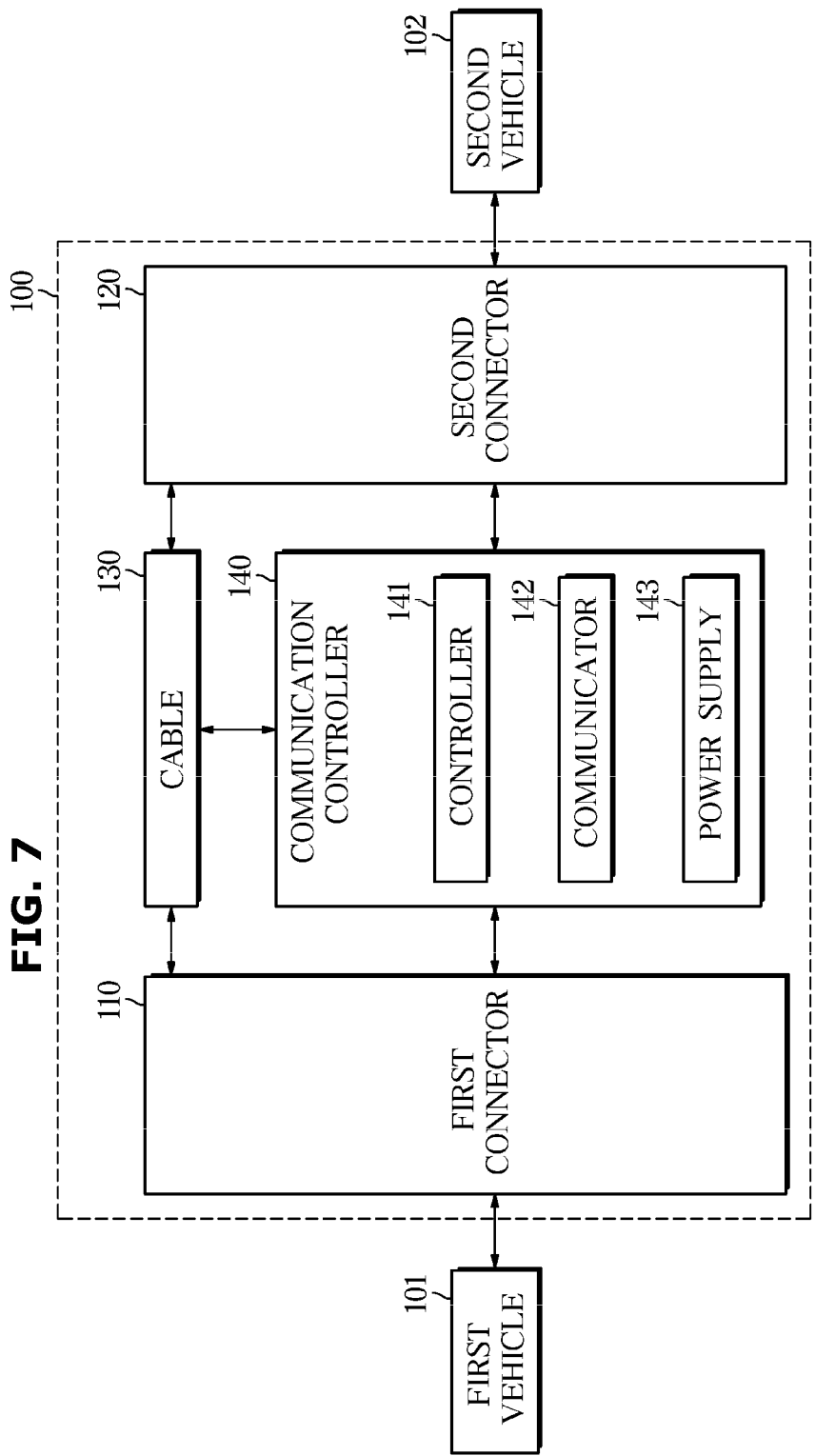
FIG. 7 is a control block diagram of a charging cable in one form of the present disclosure.

Hereinafter, the configuration of the charging cable 100 in some forms of the present disclosure will be described in detail with reference to FIG. 7. FIG. 7 is a control block diagram of a charging cable in some forms of the present disclosure.

The charging cable 100 in some forms of the present disclosure, may include a first connector 110 connected to the first vehicle 101; a second connector 120 connected with the second vehicle 102; and a cable 130 connecting the first connector 110 and the second connector 120 and provided with the communication controller 140. At this time, since the communication controller 140 is provided in the cable 130, the first vehicle 101 or the second vehicle 102 does not need to have the communication controller 140 separately.

The communication controller 140 provided in the cable 130 may include a controller 141 for controlling a charging procedure, a communicator 142 for transmitting and receiving data between a control signal or a vehicle, and a power supply 143 for supplying power to the communication controller 140.

The controller 141 may be implemented as a memory (not shown) for storing data about an algorithm or a program reproducing the algorithm for controlling the inter-vehicle charging, and a processor (not shown) for performing the above-described operation using data stored in a memory. In this case, the memory and the processor may be implemented as separate chips. Alternatively, the memory and the processor may be implemented in a single chip.

The controller 141 may be an electronic controller (ECU) for controlling the charging procedure, and may be any one of a microcomputer, a CPU, and a processor.

The communicator 142 may include a PLC PHY chip to perform power line communication (PLC). In addition, the communicator 142 may be connected to the controller 141 to transmit a control signal generated by the controller 141 to each vehicle 101, and specifically transmit to an electric vehicle communication controller (EVCC) provided in each of the vehicles 101 and 102. In addition, the communicator 142 may receive data for the state of charge of the batteries of the first vehicle 101 and the second vehicle 102 from the EVCCs of the respective vehicles 101 and 102 and transmit the data to the controller 141.

In addition, although not shown in the drawing, the communication controller 140 may include a voltage detecting sensor for detecting the proximity detection voltage output from the first proximity detection pin 111 and the proximity detection voltage output from the second proximity detection pin 121, respectively and for transmitting a detected voltage value to the controller 141.

Figure 8:
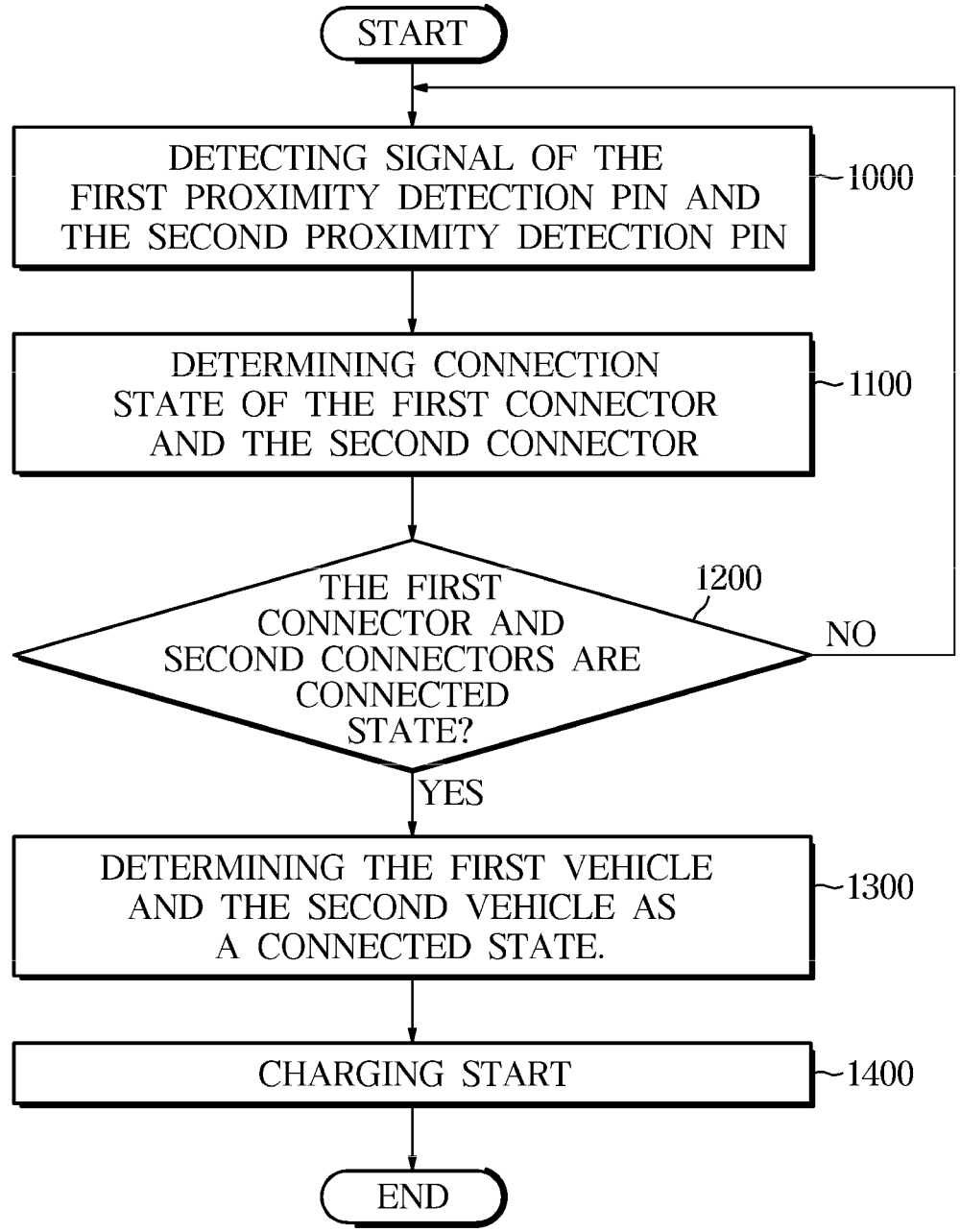
FIG. 8 is a control flowchart of a charging cable in one form of the present disclosure.

Hereinafter, a control method of the charging cable 100 in some forms of the present disclosure will be described with reference to FIG. 8. FIG. 8 is a control flowchart of a charging cable in some forms of the present disclosure.

Referring to FIG. 8, the controller 141 in some forms of the present disclosure may detect 1000 the first detection signal of the first proximity detection pin 111 and the second detection signal of the second proximity detection pin 121. Specifically, the voltage sensor included in the communication controller 140 may detect the voltage value of the proximity detection voltage output from the first proximity detection pin 111 and the proximity detection voltage output from the second proximity detection pin 121, and transmit the detected voltage value to the controller 141.

The controller 141 may determine 1100 a connection state between the first connector 110 and the first vehicle 101 based on the first detection signal of the first proximity detection pin 111, and a connection state of the second connector 120 and the second vehicle 102 based on the signal of the second proximity detection pin 121.

In detail, the connection state of the first connector 110 and the first vehicle 101 and the connection state of the second connector 120 and the second vehicle 102 may be determined by comparing each of the voltage of the first detection signal output from the first proximity detection pin 111 and the voltage of the second detection signal output from the second proximity detection pin 121 with a predetermined proximity detection voltage standard.

When at least one of the connection states of the first connector 110 and the second connector 120 is determined to be in a disconnected state (No of 1200), the controller 141 may determine the connection state between the first vehicle 101 and the second vehicle 102 as a separated state, and continuously detect the first detection signal of the first proximity detection pin 111 and the second detection signal of the second proximity detection pin 121.

When the connection state of the first connector 110 and the second connector 120 is determined to be in connected state (YES in 1200), the controller 141 may determine 1300 a connection state between the first vehicle 101 and the second vehicle 102 as a connected state.

When the first vehicle 101 and the second vehicle 102 are determined to be in connected state, the controller 141 may determine that the preparation for charging is finished and generate a control signal that starts the power transmission according to the user's input or without the user's input.

That is, when the first connector 110 and the first vehicle 101 are determined to be in connected state, and the second connector 120 and the second vehicle 102 are determined to be in connected state, the controller 141 may generate a power transmission signal.

The communicator 142 may receive 1400 the control signal of the controller 141 to the EVCC of each of the vehicles 101 and 102 to start charging. That is, the communicator 142 may transmit a charging state signal for a battery charging state of the first vehicle 101 and the second vehicle 102 through the first control pilot pin 113 of the first connector 110 and the second control pilot pin 123 of the second connector 120, and transmit the power transmission signal generated by the controller 141 through the first control pilot pin 113 and the second control pilot pin 123 to the first vehicle 101 and the second vehicle 102.

At this time, receiving the charge state signal and transmitting the power transmission signal may be using power line communication.

Meanwhile, the disclosed forms of the present disclosure may be embodied in the form of a recording medium storing instructions executable by a computer. The instructions may be stored in the form of program code and, when executed by a processor, may generate a program module to perform the operations of the disclosed forms of the present disclosure. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A charging cable comprising:
    a first connector comprising a first proximity detection pin and a first power pin;
    a second connector comprising a second proximity detection pin and a second power pin; and
    a cable configured to:
        electrically connect the first power pin and the second power pin; and
        not connect the first proximity detection pin and the second proximity detection pin.

2. The charging cable of claim 1, wherein:
    the first connector further comprises a first control pilot pin,
    the second connector further comprises a second control pilot pin, and
    the cable is configured to connect the first control pilot pin and the second control pilot pin.

3. The charging cable of claim 1, wherein:
    the first connector further comprises:
        a first ground pin electrically connected to the first proximity detection pin; and
        a first resistance located between the first ground pin and the first proximity detection pin, and
    the second connector further comprises:
        a second ground pin electrically connected to the second proximity detection pin; and
        a second resistance located between the second ground pin and the second proximity detection pin.

4. The charging cable of claim 3, wherein the cable is configured to not connect the first resistance and the second resistance.

5. The charging cable of claim 3, wherein the charging cable further comprises:
    the first connector further comprising:
        a first switch element connected in parallel with the first resistance and implemented as a normally-closed switch element that operates in response to an operation of a switch provided outside the first connector, and
    the second connector further comprising:
        a second switch element connected in parallel with the first resistance and implemented as a normally-closed switch element that operates in response to an operation of a switch provided outside the second connector.

6. A charging cable comprising:
    a first connector comprising a first proximity detection pin and a first power pin;
    a second connector comprising a second proximity detection pin and a second power pin;
    a cable configured to:
        electrically connect the first power pin and the second power pin to form a power supply path; and
        not connect the first proximity detection pin and the second proximity detection pin; and
    a communication controller configured to control supply of charging power through the power supply path corresponding to a connection state of the first connector and the second connector to the vehicle.

7. The charging cable of claim 6, wherein the communication controller further comprises:
    a controller configured to:
        determine a connection state between the first connector and a first vehicle based on a first detection signal of the first proximity detection pin; and
        determine a connection state between the second connector and a second vehicle based on a second detection signal of the second proximity detection pin.

8. The charging cable of claim 7, wherein the controller is configured to:
    determine a connection state between the first connector and the first vehicle by comparing a voltage of the first detection signal with a predetermined proximity detection voltage standard; and
    determine a connection state of the second connector and the second vehicle by comparing a voltage of the second detection signal with the predetermined proximity detection voltage standard.

9. The charging cable of claim 7, wherein the controller is configured to:
    generate a power transmission signal for controlling a supply of charging power through the power supply path when the first connector and the first vehicle are determined to be connected, and the second connector and the second vehicle are determined to be connected.

10. The charging cable of claim 9, wherein:
    the first connector further comprises a first control pilot pin,
    the second connector further comprises a second control pilot pin, and
    the communication controller further comprises:
        a communicator configured to:
            receive a charge state signal for a battery charge state of the first vehicle and the second vehicle through the first control pilot pin and the second control pilot pin; and
            transmit the power transmission signal to the first vehicle and the second vehicle through the first control pilot pin and the second control pilot pin.

11. The charging cable of claim 10, wherein the communicator is further configured to:
    transceive a signal with the first vehicle and the second vehicle using a power line communication.

12. The charging cable of claim 6, wherein:
    the first connector further comprises:
        a first ground pin electrically connected to the first proximity detection pin; and
        a first resistance located between the first ground pin and the first proximity detection pin, and
    the second connector further comprises:
        a second ground pin electrically connected to the second proximity detection pin; and
        a second resistance located between the second ground pin and the second proximity detection pin.

13. The charging cable of claim 12, wherein the cable is configured to:
    not connect the first resistance and the second resistance.

14. The charging cable of claim 13, wherein the charging cable further comprises:
the first connector further comprising:
a first switch element connected in parallel with the first resistance and implemented as a normally-closed switch element that operates in response to an operation of a switch provided outside the first connector, and
the second connector further comprising:
a second switch element connected in parallel with the first resistance and implemented as a normally-closed switch element that operates in response to an operation of a switch provided outside the second connector.

15. A control method of a charging cable comprising:
detecting a first detection signal of a first proximity detection pin and a second detection signal of a second proximity detection pin;
determining a connection state of a first connector and a first vehicle based on the first detection signal, wherein the first connector comprises the first proximity detection pin and a first power pin; and
determining a connection state between a second connector and a second vehicle based on the second detection signal, wherein the second connector comprises the second proximity detection pin a second power pin.

16. The control method of claim 15, wherein the method further comprises:
determining a connection state between the first connector and the first vehicle by comparing a voltage of the first detection signal with a predetermined proximity detection voltage standard; and
determining a connection state between the second connector and the second vehicle by comparing a voltage of the second detection signal with the predetermined proximity detection voltage standard.

17. The control method of claim 15, wherein the method further comprises:
when the first connector is connected to the first vehicle and the second connector is connected to the second vehicle, generating a power transmission signal.

18. The control method of claim 17, wherein the method further comprises:
receiving a charge state signal for a battery charge state of the first vehicle and the second vehicle through the first control pilot pin and the second control pilot pin; and
transmitting the power transmission signal to the first vehicle and the second vehicle through the first control pilot pin and the second control pilot pin.

19. The control method of claim 18, wherein the method further comprises:
transceiving a signal with the first vehicle and the second vehicle using a power line communication.

* * * * *